(12) United States Patent
Watanabe et al.

(10) Patent No.: US 10,675,763 B2
(45) Date of Patent: Jun. 9, 2020

(54) INFORMATION PROCESSING APPARATUS FOR DETERMINING INTERFERENCE BETWEEN OBJECT AND GRASPING UNIT, INFORMATION PROCESSING METHOD, AND STORAGE MEDIUM

(71) Applicant: CANON KABUSHIKI KAISHA, Tokyo (JP)

(72) Inventors: Daisuke Watanabe, Utsunomiya (JP); Shinji Uchiyama, Utsunomiya (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/453,185

(22) Filed: Mar. 8, 2017

(65) Prior Publication Data

US 2017/0173798 A1    Jun. 22, 2017

Related U.S. Application Data

(63) Continuation of application No. 14/312,529, filed on Jun. 23, 2014, now Pat. No. 9,616,572.

(30) Foreign Application Priority Data

Jun. 28, 2013  (JP) .................................. 2013-136176

(51) Int. Cl.
    *G06K 9/00*    (2006.01)
    *B25J 9/16*    (2006.01)
    *G06T 19/20*   (2011.01)

(52) U.S. Cl.
    CPC ............. *B25J 9/1697* (2013.01); *G06T 19/20* (2013.01); *G05B 2219/40053* (2013.01)

(58) Field of Classification Search
    None
    See application file for complete search history.

(56) References Cited

U.S. PATENT DOCUMENTS

2006/0104788 A1* 5/2006 Ban ..................... B25J 9/1697
                                                    414/729
2011/0222995 A1* 9/2011 Irie ..................... B25J 9/1687
                                                    414/225.01

(Continued)

FOREIGN PATENT DOCUMENTS

| JP | 2001-277167 A | 10/2001 |
| JP | 2013-109691 A | 6/2013 |
| WO | 2012/066819 A1 | 5/2012 |

OTHER PUBLICATIONS

Hayashi et al.; Development of Bin Picking Robotics using 3-D Object Recognition; Journal of IHI Technologies; vol. 48, No. 1, pp. 7-11.

*Primary Examiner* — Tahmina N Ansari
(74) *Attorney, Agent, or Firm* — Canon U.S.A., Inc. IP Division

(57) ABSTRACT

An information processing apparatus of the present invention correctly determines in advance whether interference occurs between an object around a target workpiece to be grasped, and a hand. The information processing apparatus includes an obtaining unit configured to obtain a range image of a space including a plurality of workpieces, an identification unit configured to identify, from the obtained range image, an area of the target workpiece to be grasped among the plurality of workpieces, an interference determination unit configured to determine whether interference occurs between an area included in the range image and a grasping unit configured to grasp the target workpiece, and an output unit configured to output, based on a result of the interference determination by the interference determination unit, a result of determination as to whether interference occurs between an area excluding the area of the target workpiece and the grasping unit.

22 Claims, 6 Drawing Sheets

(56) References Cited

U.S. PATENT DOCUMENTS

| | | | |
|---|---|---|---|
| 2012/0158180 A1* | 6/2012 | Iio | B25J 9/1679 |
| | | | 700/259 |
| 2012/0188209 A1* | 7/2012 | Kaido | G01C 21/367 |
| | | | 345/204 |
| 2014/0017048 A1* | 1/2014 | Mattern | B25J 9/1612 |
| | | | 414/567 |
| 2015/0003678 A1* | 1/2015 | Watanabe | B25J 9/1697 |
| | | | 382/103 |

* cited by examiner

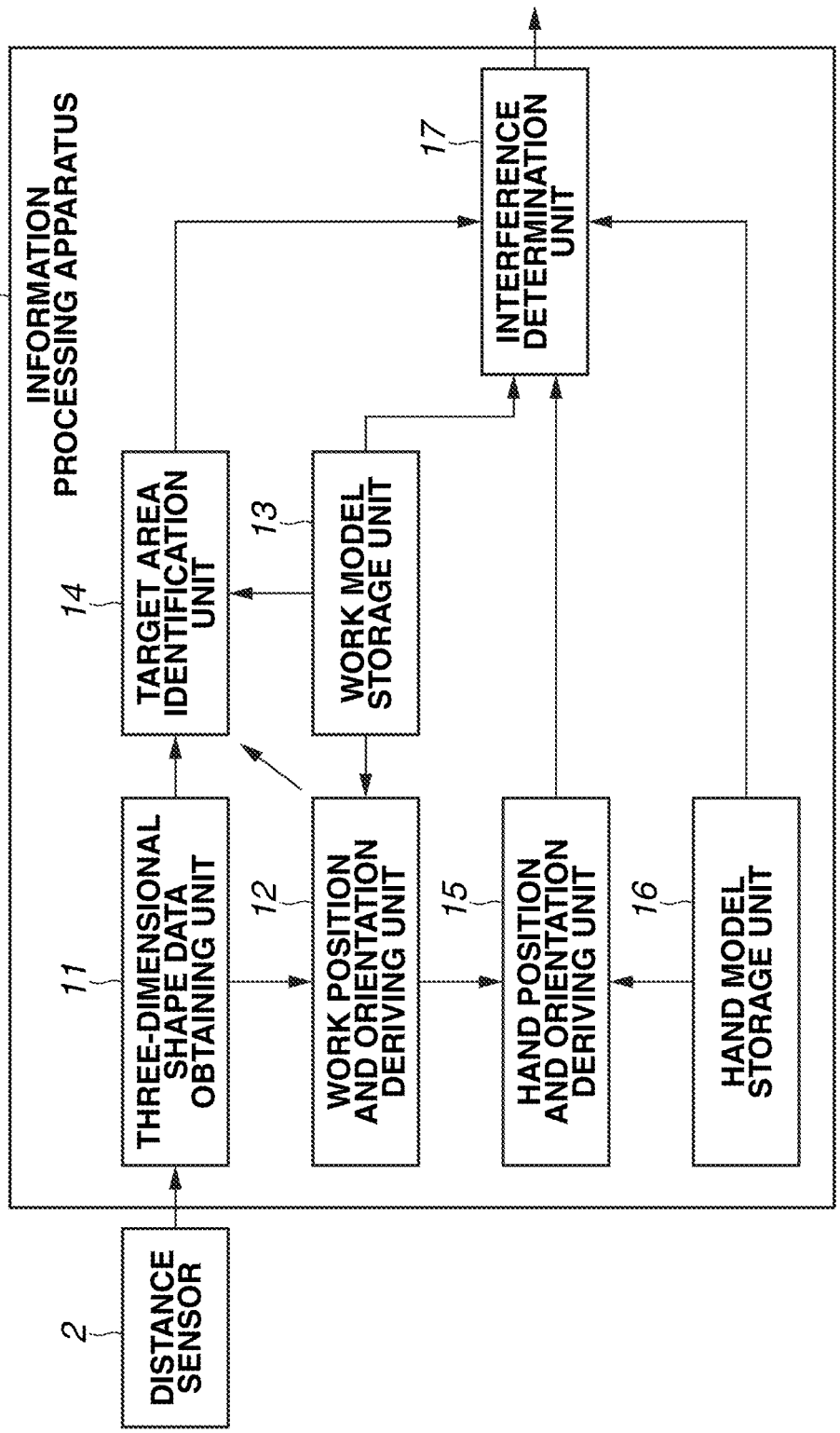

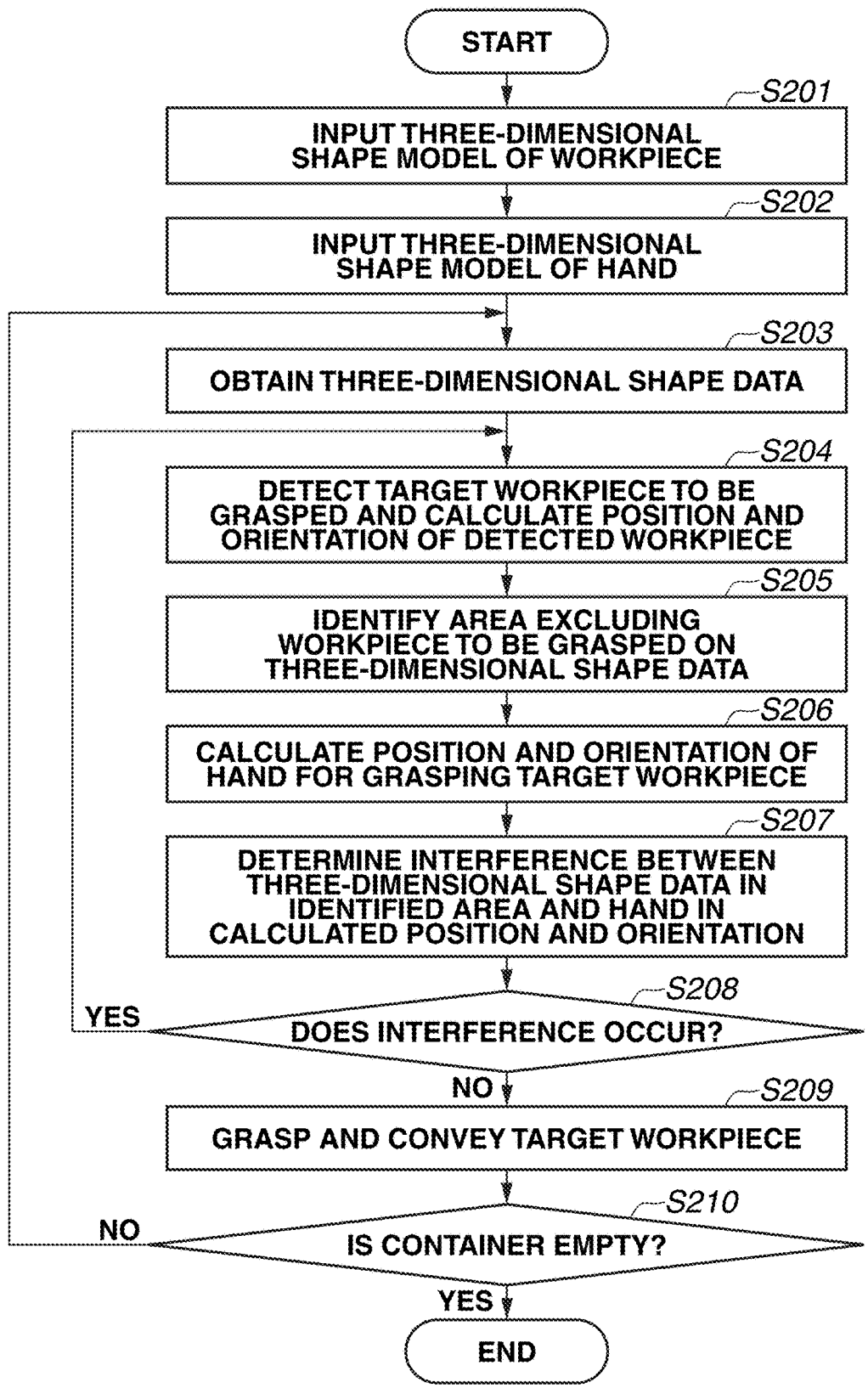

RANGE IMAGE

OBSERVED VIRTUAL IMAGE

RANGE IMAGE

INFORMATION PROCESSING APPARATUS FOR DETERMINING INTERFERENCE BETWEEN OBJECT AND GRASPING UNIT, INFORMATION PROCESSING METHOD, AND STORAGE MEDIUM

CROSS-REFERENCE TO RELATED APPLICATIONS

This application is a continuation of U.S. patent application Ser. No. 14/312,529, filed Jun. 23, 2014, which claims the benefit of Japanese Patent Application No. 2013-136176 filed Jun. 28, 2013, all of which are hereby incorporated by reference herein in their entirety.

BACKGROUND OF THE INVENTION

Field of the Invention

The present invention relates to an information processing apparatus which determines whether interference occurs in grasping a workpiece.

Description of the Related Art

In recent years, there has been developed a technique for picking up an individual workpiece from a pile of workpieces, which uses a vision system to identify an individual workpiece from a pile of workpieces and recognize the three-dimensional position and orientation of the workpiece so as to grasp the workpiece with a hand that a robot has, for example, at a production line of a factory. In grasping the workpiece recognized by the technique, to prevent the hand from colliding with the container of the workpieces or with a peripheral object such as any workpiece other than the workpiece to be grasped, it is necessary to perform processing to determine in advance whether such a collision occurs.

For example, in a method discussed in Japanese Patent Application Laid-Open No. 2010-207989, a distance from a sensor attached above a target workpiece to the workpiece is obtained in an image format to recognize the position and orientation of the workpiece from the obtained distance information (range information), and then an interference determination is made in advance based on the shape, position, and orientation of a hand for grasping the workpiece and on the obtained distance information. More specifically, the hand is virtually moved upward to a reference height position in the z-direction of the recognized workpiece. Then, the hand is virtually lowered in the z-direction from the reference height position to a position for grasping the workpiece. After the hand is lowered, the first and second fingers are slightly opened at the grasping position and a virtual flat plate to be used for the interference determination is virtually set so as to have an appropriate allowance A from each of the finger tips of the fingers toward the lower part in the z-direction, and also to have an appropriate allowanceΔ between each of the finger tips and the workpiece. If, in the distance information in the image format obtained by the sensor, there is an object having a z-value larger than that of the virtual flat plate in a distance value of a pixel overlapping the virtual flat plate, it is determined that the interference will occur. This can determine at a high speed and in advance whether interference with an peripheral object will occur when the hand grasps the recognized workpiece.

However, in the method discussed in Japanese Patent Application Laid-Open No. 2010-207989, distance information representing the shape of the target workpiece to be grasped is also included in the obtained distance information in the image format. In the method discussed in Japanese Patent Application Laid-Open No. 2010-207989, each of the fingers is separated by an appropriate allowanceΔ from the workpiece to prevent an erroneous determination that there is interference with the target workpiece itself. For this reason, it may be determined that interference occurs with a peripheral object with which the hand does not actually interfere in grasping the target workpiece.

SUMMARY OF THE INVENTION

According to an aspect of the present invention, an information processing apparatus includes an obtaining unit configured to obtain a range image of a space including a plurality of objects, an identification unit configured to identify, from the obtained range image, an area of a target object to be grasped among the plurality of objects, an interference determination unit configured to determine whether interference occurs between an area included in the range image and a grasping unit for grasping the target object, and an output unit configured to output, based on a result of the interference determination by the interference determination unit, a result of determination as to whether interference occurs between an area excluding the area of the target object and the grasping unit.

According to exemplary embodiments of the present invention, it is possible to correctly determine in advance whether interference occurs between an object excluding a target workpiece to be grasped and a hand.

Further features of the present invention will become apparent from the following description of exemplary embodiments with reference to the attached drawings.

BRIEF DESCRIPTION OF THE DRAWINGS

FIG. 2 is a block diagram illustrating an example of configuration of an information processing apparatus according to the first exemplary embodiment of the present invention.

FIG. 3 is a flowchart illustrating pick-up processing by the workpiece pick-up system including the information processing apparatus according to the first exemplary embodiment of the present invention.

DESCRIPTION OF THE EMBODIMENTS

Prior to describing exemplary embodiments of the present invention, a configuration of hardware included in the information processing apparatus according to the exemplary embodiments will be described below with reference to FIG. 6.

Figure 6:
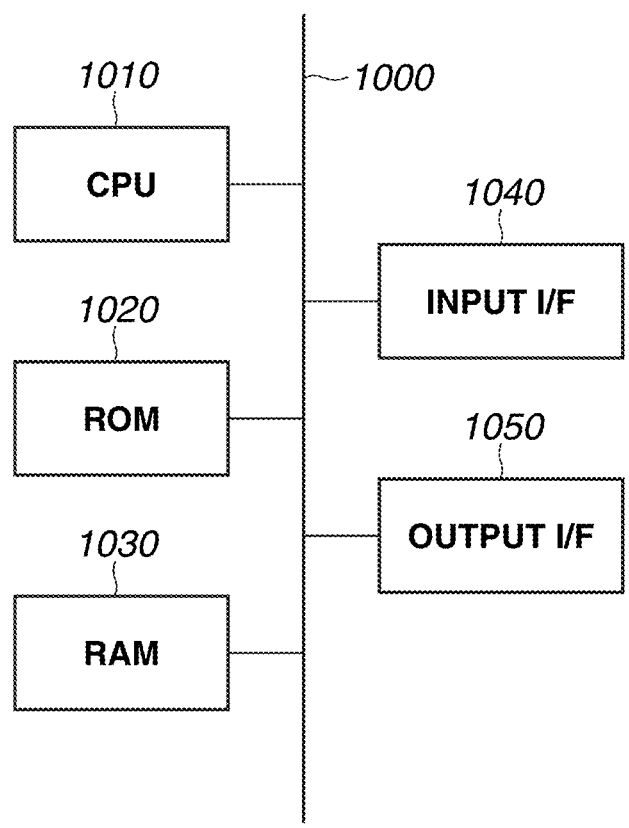
FIG. 6 is a block diagram illustrating a hardware configuration of the information processing apparatus according to exemplary embodiments of the present invention.

FIG. 6 illustrates a hardware configuration of the information processing apparatus according to an exemplary embodiment. In FIG. 6, a central processing unit (CPU) 1010 comprehensively controls each device connected thereto via a bus 1000. The CPU 1010 reads and executes processing steps and a program stored in a read only memory (ROM) 1020. An operating system (OS), each processing program according to an exemplary embodiment, and a device driver are stored in the ROM 1020, and temporarily stored in a random access memory (RAM) 1030 to be executed by the CPU 1010 if needed. An input interface (I/F) 1040 inputs an input signal which can be processed by the information processing apparatus from an external apparatus (such as a distance sensor or an operation device). An output interface (I/F) 1050 outputs an output signal which can be processed by an external apparatus (such as a display device or a robot controller) to the external apparatus.

The CPU 1010 loads a program stored in the ROM 1020 into the RAM 1030 and executes processing according to each of the flowcharts to be described below to realize the above function units. For example, if hardware is configured as a substitute of software processing using the CPU 1010, a calculation unit or a circuit corresponding to each function unit described herein has only to be configured.

A first exemplary embodiment provides a method in which, when a detected workpiece is to be grasped, the area of the target workpiece to be grasped is identified on a two-dimensional image by using the position and orientation of the target workpiece so that whether a hand interferes with a peripheral object is determined in advance.

Specifically, first, based on the position and orientation of the detected workpiece, a three-dimensional shape model of the workpiece is projected onto an image plane observed by a virtual camera having similar camera parameters to those of a measuring apparatus. Then, three-dimensional points on the distance image corresponding to pixels onto which the workpiece is projected are determined as the area of the target workpiece to be grasped. Further, three-dimensional shape data excluding the three-dimensional points determined as the area of the target workpiece, and a hand model are used to detect a three-dimensional spatial overlap to determine whether interference occurs.

Thereby, even for a grasp operation of the hand extremely close to the target workpiece to be grasped, it is possible to correctly determine whether interference occurs between a peripheral (surrounding) object and a hand without an erroneous detection due to a measurement point of the target workpiece.

Figure 1:
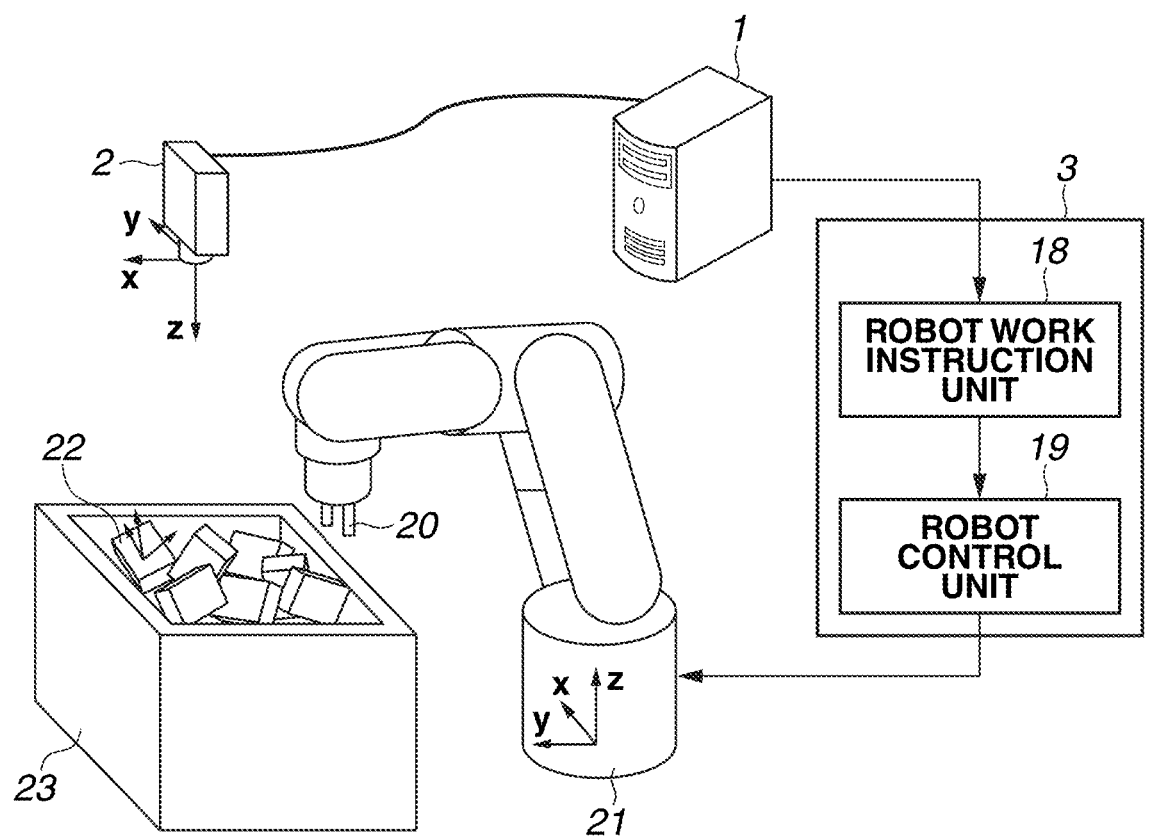
FIG. 1 illustrates a configuration of a system for picking up a workpiece from a pile of workpieces (hereinafter referred to as a workpiece pick-up system) according to a first exemplary embodiment of the present invention.

FIG. 1 illustrates a configuration of a workpiece pick-up system 10 including an information processing apparatus 1 according to the present exemplary embodiment. The workpiece pick-up system 10 includes the information processing apparatus 1, a robot controller 3, and a robot arm 21 with a hand 20 capable of grasping a target workpiece 22. The workpiece pick-up system 10 allows, among the target workpieces 22 contained in a workpiece container 23, a target workpiece 22 which does not cause interference to be identified and then grasped with the hand 20.

The robot controller 3 includes a robot work instruction unit 18 and a robot control unit 19.

Based on an output result of the information processing apparatus 1, the robot work instruction unit 18 instructs the robot control unit 19 to grasp the target workpiece 22 determined not to cause interference between the hand 20 and a peripheral object in a grasp operation.

The robot control unit 19 receives instruction information from the robot work instruction unit 18 and controls the operation of the robot arm 21 and the hand 20 to grasp and convey the target workpiece 22.

The hand (grasping unit) 20 is an end effecter which is attached to a flange at the tip of the robot arm 21 and performs a grasping operation of the target workpiece 22 under the operation control of the robot control unit 19. The hand 20 may be a magnet type or an attraction type hand which grasps the target workpiece 22 by pressing itself against a flat portion of the target workpiece 22, or a gripper type hand which opens and closes a plurality of fingers (two or three fingers) to hold and grasp an object from inside or outside. Other than that, any hand is available provided that it is an end effecter which has a grasping mechanism and can be attached to the robot arm 21.

The robot arm 21 is a multiple degree-of-freedom robot which can move the hand 20 to the position and orientation where the hand 20 can grasp the target workpiece 22, under the operation control of the robot control unit 19.

A distance sensor (range sensor) 2 is a sensor used for obtaining a distance image (range image) storing depth information in each pixel. As the distance sensor 2, an active distance sensor is available in which the reflected light of, for example, laser light, slit light, or random dot pattern light with which a target object is irradiated is captured by a camera to measure a distance by triangulation. There may be used various methods such as a spatial encoding method or a phase shift method as an active distance measurement method. The distance sensor 2 is not limited to the above one, and may use a time-off-flight method using flight time of light. Alternatively, a passive method may be used which calculates the depth of each pixel by triangulation from an image captured by a stereo camera. Other than that, any method does not detract the gist of the present exemplary embodiment, provided that the method can obtain the three-dimensional position of the surface of a target object from the range image.

A configuration of the information processing apparatus 1 will be described below with reference to FIG. 2. FIG. 2 is a block diagram illustrating an example of a functional configuration of the information processing apparatus 1.

The information processing apparatus 1 includes a three-dimensional shape data obtaining unit 11, a work position and orientation deriving unit 12, a work model storage unit 13, a target area identification unit 14, a hand position and orientation deriving unit 15, a hand model storage unit 16, and an interference determination unit 17. Each of the units will be described below.

The three-dimensional shape data obtaining unit 11 obtains three-dimensional shape data representing the shape of the surface of a pile of the target workpieces 22. More specifically, a range image is captured by the distance sensor 2, and then a three-dimensional point group obtained by calculating three-dimensional coordinates from the coordinates and the depth value of each pixel is obtained as the three-dimensional shape data.

The measurement information obtained by the three-dimensional shape data obtaining unit 11 is input to the work position and orientation deriving unit 12. Hereinafter, the coordinate system set to the work position and orientation deriving unit 12 is referred to as a sensor coordinate system. In the present exemplary embodiment, it is assumed that a geometric relationship is fixed between the distance sensor 2 and the robot, and a relative position and orientation therebetween is known by previously conducting a robot vision calibration for obtaining the relative position and orientation. In the present exemplary embodiment, a description has been made on the assumption that the distance sensor 2 is fixed above the workpiece container 23. However, the distance sensor 2 may be fixed to the robot arm 21.

The work position and orientation deriving unit 12 detects an individual workpiece 22 existing inside the workpiece container 23 based on the information input by the three-dimensional shape data obtaining unit 11, and calculates six parameters representing the position and orientation of the detected workpiece 22 in the sensor coordinate system.

In the present exemplary embodiment, pieces of range image information obtained by observing the workpieces from a large number of positions and orientations are stored in a database as patterns in advance, and the range image obtained by measurement using the distance sensor 2 is matched with the patterns to detect an individual workpiece 22 so that an approximate position and orientation of the workpiece 22 are calculated. Then, the position and orientation of the workpiece 22 are calculated again based on the approximate position and orientation. The three-dimensional point group expected to be observed when the workpiece 22 is obtained as the range image has been previously extracted from the three-dimensional shape model of the workpiece 22, which is to be used in the subsequent-stage processing. A corresponding relationship between this three-dimensional point group and the three-dimensional point group derived from the range image obtained by the distance sensor 2 is obtained, and the position and orientation of the workpiece 22 are calculated so that both the three-dimensional point groups fit each other. Any method other than the method described above may be used as long as the method can use the range image obtained by the three-dimensional shape data obtaining unit 11 to detect an individual workpiece 22 to be grasped from a pile of workpieces and then derive its three-dimensional position and orientation.

The work model storage unit 13 stores the three-dimensional shape model of the target workpiece 22 to be picked up from a pile. As the three-dimensional shape model (three-dimensional model information), a polygon model approximately representing the three-dimensional shape of the workpiece 22 may be used, for example. The polygon model is configured by the three-dimensional coordinates of the surface points of the target workpiece shape and by link information therebetween for configuring triangular faces (polygons) approximating the shape. A polygon is generally formed by a triangle. However, it may be formed by a square or a pentagon. Any polygon model may be used as long as it can approximately represent the shape of the workpiece 22 based on the coordinates of the surface points and its link information. However, the three-dimensional shape model is not limited to the polygon model. The three-dimensional shape model may be a model representing the shape with a set of segmented parameter curved surfaces, which is referred to as a boundary representation (B-Rep), such as computer aided design (CAD) data (CAD model). Other than those above, any three-dimensional shape model of the workpiece 22 may be used as long as it is capable of representing a surface shape. The three-dimensional shape model is used when the three-dimensional points corresponding to the area of the target workpiece 22 are identified from the three-dimensional point group obtained from the range image.

The target area identification unit 14 identifies an area excluding the area of the target workpiece 22 from the three-dimensional shape data of space including the target workpiece 22 obtained by the three-dimensional shape data obtaining unit 11. The target area identification unit 14 then outputs information about the identified area to the interference determination unit 17.

The hand position and orientation deriving unit 15 derives the position and orientation of the hand 20 for grasping the target workpiece 22, based on the position and orientation of the workpiece 22 derived by the work position and orientation deriving unit 12. Specific processing will be described below. The hand position and orientation deriving unit 15 outputs information about the derived position and orientation of the hand 20 to the interference determination unit 17.

The hand model storage unit 16 stores the three-dimensional shape model of the hand 20 for grasping the target workpiece 22. The three-dimensional shape model of the hand 20 is similar to the three-dimensional shape model of the workpiece 22, and thus the description thereof is omitted here. The hand model storage unit 16 outputs the stored three-dimensional shape model of the hand 20 to the hand position and orientation deriving unit 15 and the interference determination unit 17.

The interference determination unit 17 performs an interference determination for the area excluding the area of the target workpiece 22 identified by the target area identification unit 14, in the three-dimensional shape data obtained by the three-dimensional shape data obtaining unit 11. In the interference determination, the interference determination unit 17 determines whether interference occurs between the hand model in the position and orientation of the hand 20 derived by the hand model storage unit 16, and an object around the target workpiece 22. For the interference determination, the interference determination unit 17 uses a collision determination technique, which is generally used in, for example, game programming, while using a polygon model representing the three-dimensional shape of the hand 20 stored in the hand model storage unit 16. Specifically, whether the interference occurs is detected by detecting an overlap on a three-dimensional space between the three-dimensional shape data obtained from the range image obtained by using a vision system to capture an image of a pile of workpieces, and the shape of the hand 20 in the position and orientation for grasping the detected workpiece 22. The interference determination unit 17 performs the above-described interference determination processing. If the interference determination unit 17 determines that no interference occurs, the interference determination unit 17 outputs information about the target workpiece 22 to the robot work instruction unit 18. Even if the interference determination unit 17 determines that interference occurs, the interference determination unit 17 may output the result of the interference determination. Alternatively, the interference determination unit 17 may output the result of the interference determination to a display device to cause the display device to display the result of the interference determination, instead of directly outputting the result thereof to the robot work instruction unit 18.

FIG. 3 is a flowchart illustrating processing for picking up a workpiece from a pile of workpieces by previously determining whether interference occurs in a grasp operation, which is performed using the information processing apparatus 1 according to the present exemplary embodiment.

In step S201, the work model storage unit 13 inputs the three-dimensional shape model of the workpiece 22 stored therein into the work position and orientation deriving unit 12 and the interference determination unit 17.

In step S202, the hand model storage unit 16 inputs the model representing the three-dimensional shape of the hand 20 stored therein to the hand position and orientation deriving unit 15 and the interference determination unit 17. It is assumed here that a polygon model approximating the three-dimensional shape with a set of polygons is input thereto.

In step S203, the three-dimensional shape data obtaining unit 11 captures a range image of a pile of target workpieces 22, calculates the coordinate data of the three-dimensional point group from the coordinates and depth of each pixel, and then inputs the calculated coordinate data to the work position and orientation deriving unit 12. The total number of points in the three-dimensional point group is taken as N. It is assumed that the coordinates of each point of the obtained three-dimensional point group is represented by a reference coordinate system. Hereinafter, each point of the three-dimensional point group represented by the reference coordinate system is given identification (ID), and i-th three-dimensional point is referred to as $k_{c\_i}$. Link information is recorded in the coordinates of each three-dimensional point generated in this step and the coordinates of each corresponding pixel of the range image for the purpose of cross reference.

In step S204, the work position and orientation deriving unit 12 detects a single individual workpiece 22 to be grasped among the pile of workpieces, and calculates six parameters representing the position and orientation of the detected workpiece 22 in the sensor coordinate system. Various methods can be used for detecting the individual workpiece 22 and calculating the position and orientation thereof. As described above, in this step, the pattern of each range image obtained by observing the workpieces from a large number of positions and orientations is matched with the range image obtained in step S203, and the observed position and orientation corresponding to the data highest in score is obtained as an approximate position and orientation of the target workpiece 22 to be grasped. Specifically, the approximate position and orientation are calculated by using a method discussed in Japanese Patent Application Laid-Open No. 2001-14307, in which a positional relationship between feature points on the range image is compared with a positional relationship between feature points in each observed position and orientation existing in a database, and the feature point groups most matched each other are selected. With the calculated approximate position and orientation as an initial value, using a method called an iterative closest point (ICP) method, a position and an orientation where the three-dimensional shape model of the workpiece 22 can match the three-dimensional point group obtained from the range image in the three-dimensional space is calculated The point group extracted from the surface of the three-dimensional shape model of the workpiece 22 is taken as P.

$$P = \{p_{m\_1}, p_{m\_2}, \ldots, p_{m\_N}\} \quad (1)$$

The three-dimensional point group obtained from the range image is taken as K.

$$K = \{k_{m\_1}, k_{m\_2}, \ldots, k_{m\_N}\} \quad (2)$$

A point group P sampled from the surface of the three-dimensional shape model is converted, and position and orientation parameters for corresponding the point group P to the three-dimensional point group K obtained from the range image are calculated. When each point $p_i$ of the point group P is converted to the sensor coordinate system based on the approximate position and orientation, the point closest in distance in the point group K is taken as $b_i \in K$, an error function can be defined by the following equation (3).

Where, R and t are an orientation parameter and a movement vector to be obtained, respectively.

$$E(R, t) = \sum_{i=1}^{N_P} \|b_i - (Rp_i + t)\|^2 \quad (3)$$

The R and t that reduce the error function E are obtained to calculate six parameters representing the position and orientation. A method for obtaining the R and t that reduce the error function E will be discussed in the follow paper: K. S. Arun, T. S. Huang, and S. D. Blosteln, "Least-Squares Fitting of Two 3-D Point Sets," PAMI, vol. 9, no. 5, 1987. In this step, instead of directly obtaining the R and t as described above, the R and t may be calculated by repeating the correction of the position and orientation parameters of the workpiece 22 by using a nonlinear optimization method such as the Gauss-Newton method. Any method may be used as long as it can detect a single individual workpiece 22 from a pile of workpieces and calculate six parameters representing the position and orientation of the workpiece 22 in the sensor coordinate system.

In step S205, the target area identification unit 14 identifies, based on the position and orientation of the target workpiece 22 derived in step S204, the three-dimensional points excluding the target workpiece 22 on the three-dimensional shape data. The processing in this step will be described with reference to FIGS. 4A to 4D.

Figure 4A:
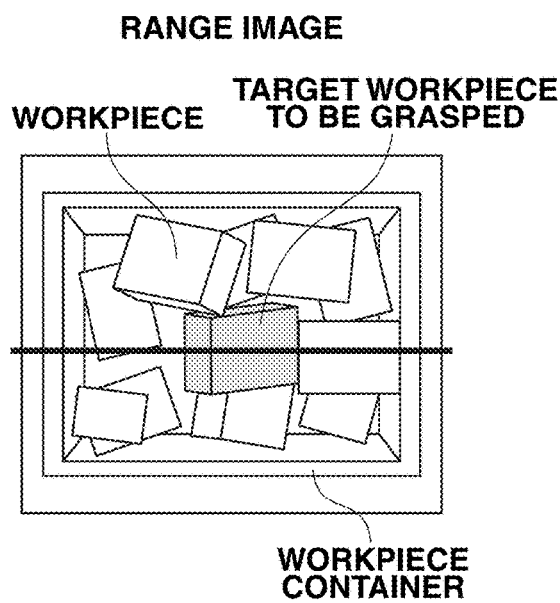
FIGS. 4A, 4B, 4C, and 4D are schematic diagrams illustrating a determination as to whether objects around a target workpiece to be grasped interfere with a hand according to the first exemplary embodiment of the present invention.

FIG. 4A illustrates a range image obtained by capturing a pile of workpieces in a container, and the target workpiece 22 which is detected and whose position and orientation are calculated from the range image in step S204. Here, three-dimensional shape data excluding the target workpiece 22 is identified by the following method using the three-dimensional shape model of the workpiece stored in the work model storage unit 13, and the position and orientation of the target workpiece 22.

First, an image plane observed by a virtual camera is prepared. On the observed image plane, the three-dimensional shape model of the workpiece is rendered based on the calculated position and orientation. For camera parameters of the virtual camera, it is recommended to obtain and use the same camera parameters as those of an imaging apparatus actually used by the three-dimensional shape data obtaining unit 11. Using the same camera parameters causes each pixel (x, y) of the range image captured by the three-dimensional shape data obtaining unit 11 to correspond to (x, y) on the observed image plane of the virtual camera. However, if a corresponding relationship in the pixel between the captured range image and the observed image plane of the virtual camera can be identified, the same camera parameters do not necessarily be used. Prior to the rendering processing, the entire image plane is initialized with a color such as (R, G, B)=(0, 0, 0).

Figure 4B:
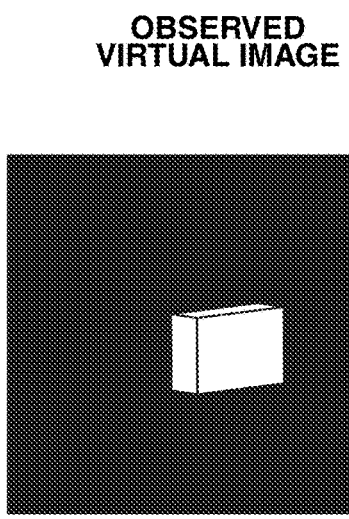

To identify the pixels on which the workpiece 22 is rendered, a specific color excluding the color used for initialization is allocated to each face forming the three-dimensional shape model, and each face is rendered in the allocated color. For example, if a polygon model is used, color of (R, G, B)=(255, 0, 0) is allocated to all polygons forming the polygon model to perform rendering. If a B-Rep model having sectioned parameter curved surfaces is used, a specific color is allocated to each of the curved surfaces to perform rendering. As long as the pixels of the area where the workpiece 22 is rendered can be identified, a color image or a grayscale picture may be used or a different or same color may be allocated to each face. Alternatively, a binarized image may be used. FIG. 4B illustrates an image generated by performing the above-described processing on the target workpiece 22 illustrated in FIG. 4A.

The luminance values (R, G, B) of the pixels on the observed image plane corresponding to the pixels (x, y) on the range image are sequentially referenced to sequentially determine whether the three-dimensional points calculated from the pixels are the area corresponding to the target workpiece 22. For example, it is assumed that the luminance value of a pixel on the observed image plane corresponding to a target pixel (x, y) of the range image is (R, G, B)=(255, 0, 0). In this case, the three-dimensional point calculated from the pixel is determined to be the data representing the shape corresponding to the target workpiece 22, and a value of 0 is recorded in association with the pixel. Alternatively, it is assumed that the luminance value of a pixel on the observed image plane corresponding to a target pixel (x, y) of the range image is (R, G, B)=(0, 0, 0). In this case, the three-dimensional point calculated from the pixel is determined to be the data representing the shape of a peripheral object such as the workpiece container 23 or any workpiece other than the target workpiece 22, and a value of 1 is recorded in association with the pixel. Performing this processing on all the pixels can identify whether the three-dimensional point calculated from each of the pixels corresponds to either the data representing the shape of the target workpiece 22 or the data representing the shape of a peripheral object excluding the target workpiece 22.

Here, the luminance value of a color buffer in a frame buffer storing the resultant image of the rendering is referenced to identify the area of the target workpiece 22. However, instead of the color buffer, the value of a depth buffer or a stencil buffer may be referenced to perform the identification. Alternatively, instead of the rendering, a virtual light ray which travels from the original point of a virtual camera coordinate system to each pixel may be calculated to determine whether the light ray intersects the target workpiece 22, so that the area of the target workpiece 22 is determined.

Figure 4C:
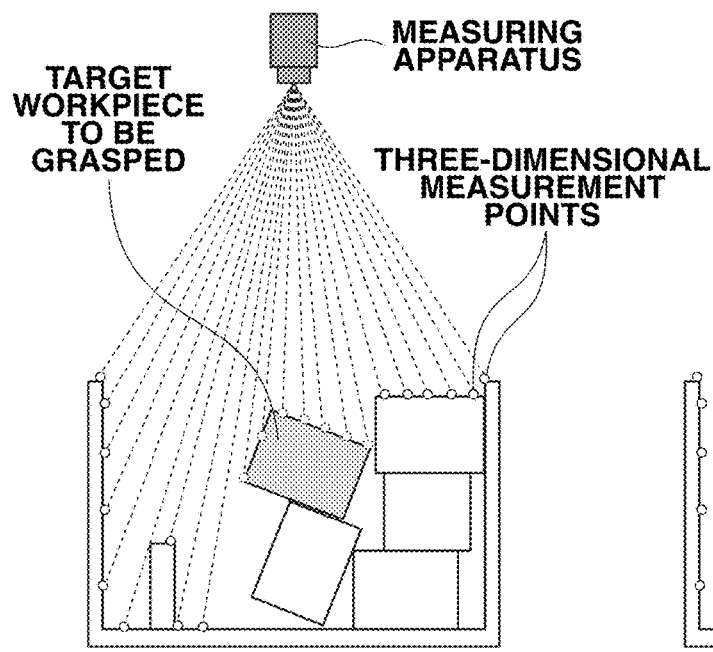

FIG. 4C illustrates a cross section taken along the thick line on the range image illustrated in FIG. 4A. Three-dimensional points calculated from the range image obtained by the three-dimensional shape data obtaining unit 11 are indicated by small blank circles. The three-dimensional points corresponding to the target workpiece 22 among the blank circles in the above processing are indicated by broken lines. An interference determination is made by excluding the three-dimensional points corresponding to the target workpiece 22 indicated by broken lines and by using the three-dimensional points indicated by blank circles, so that whether interference occurs with an object excluding the target workpiece 22 can be determined.

The area of the target workpiece 22 can also be determined by the following method. For example, if one type of workpiece 22 is grasped from workpieces of different types which are mixed and piled in different colors, a luminance image capable of identifying a correspondence with the range image may be obtained to identify the area of the target workpiece 22 based on pixel color information of the luminance image. More specifically, if the target workpiece 22 is colored in red, providing information, in which the measurement point of a pixel on the range image corresponding to a red pixel on the luminance image is invalid and the measurement point on the range image corresponding to a pixel excluding the red pixel is valid, enables processing for identifying the target workpiece 22.

In step S206, the hand position and orientation deriving unit 15 derives, based on the position and orientation of the workpiece 22 derived in step S204, the position and orientation of the hand 20 for performing a grasp operation of the workpiece 22, in the sensor coordinate system. Specifically, a relative position and orientation between the workpiece 22 and the hand 20 in the grasp operation is recorded in advance as information for teaching the grasp operation. The relative position and orientation between the workpiece 22 and the hand 20 are set by operating the models of the workpiece 22 and the hand 20 in a virtual environment. Alternatively, the hand 20 which allows obtaining a relative position and orientation between the distance sensor 2 and the hand 20 may be moved to the position and orientation where the hand 20 can grasp the workpiece 22 whose position and orientation have been obtained in the sensor coordinate system based on the data measured by the distance sensor 2, so that the position and the orientation of the hand 20 are calculated from the position and orientation between the workpiece 22 and the hand 20. A coordinate transformation matrix representing the calculated position and orientation of the workpiece 22 is multiplied by a coordinate transformation matrix representing the relative position and orientation between the workpiece 22 and the hand 20 based on the recorded teaching information so as to obtain the coordinate transformation matrix of the hand 20 in the sensor coordinate system and calculate the position and orientation between the workpiece 22 and the hand 20.

Figure 4D:
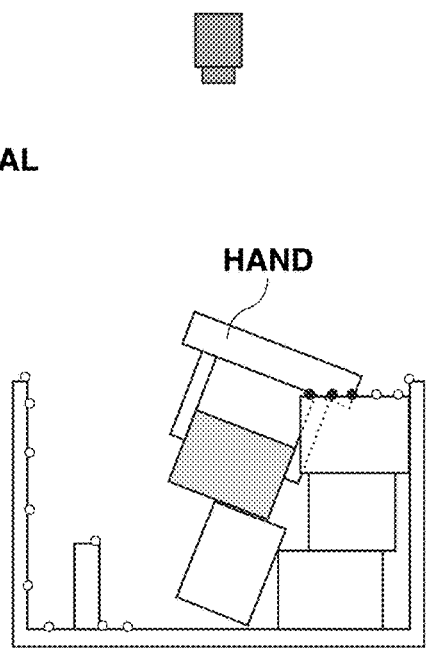

FIG. 4D illustrates a state where the hand 20 for grasping the target workpiece 22 illustrated in FIG. 4C is arranged after deriving the position and orientation thereof in this step. The three-dimensional points determined as corresponding to the target workpiece 22 in step S205 are removed.

In step S207, the target area identification unit 14 determines whether the three-dimensional shape data excluding the target workpiece 22 identified in step S205 interferes with the hand 20 in the position and orientation calculated in step S206.

A polygon model representing the shape of the hand 20 is arranged at the position and orientation derived in step S206. Further, a very small sphere with a radius of r is arranged at a position of each of the three-dimensional points of the three-dimensional shape data excluding the target workpiece 22. A three-dimensional spatial overlap between each polygon and the sphere is detected to perform an interference determination. If the sphere and the polygon overlap each other, it is determined that interference occurs. If the sphere and the polygon do not overlap each other, it is determined that interference does not occur. A method discussed in "Christer Ericson, a real-time collision determination for game programming, bone digital, 2005" can be used as a method for processing information between the polygon and the sphere. In FIG. 4D, among the three-dimensional points excluding the target workpiece 22, those determined as interfering with the hand 20 as a result of the interference determination between the sphere and the polygon are indicated by black points.

The interference determination may be performed by using other methods. For example, the three-dimensional points between adjacent pixels on the range image are connected to generate polygons representing the three-dimensional shape data of a pile of workpieces, and an intersection with a polygon of the polygon model of the hand 20 in the grasp position and orientation is detected to perform the interference determination. In this case, if the intersection exists between the polygons, it is determined that interference occurs. If the intersection does not exist between the polygons, it is determined that interference does not occur and the result is output. A method discussed in "Tomas Moller, A Fast Triangle-Triangle Intersection Test, 1997" can be used as a method for processing information between the polygons. Here, a polygon model is used as the shape model of the hand 20. However, a model representing the three-dimensional shape by a combination of simple geometric shapes such as a cylinder, a sphere, or a rectangular parallelepiped may be used. Other than that, any method may be used as long as the method can detect a three-dimensional spatial overlap between the three-dimensional shape data of a pile of workpieces and the shape model of the hand 20 for grasping the target workpiece 22. The shape model of the hand 20 may be enlarged in the direction opposite to the target workpiece 22. An interference determination using the enlarged shape model of the hand 20 can provide allowance for the grasp operation actually performed.

As a result of the processing in step S207, in step S208, if it is determined that interference does not occur, the processing proceeds to step S209. If it is determined that interference occurs, the processing proceeds to step S202 and another individual workpiece 22 is detected and the position and orientation thereof are calculated.

In step S209, the robot work instruction unit 18 transmits an operation signal to the robot control unit 19. The robot control unit 19 operates the robot arm 21 to move the hand 20 to the position and orientation where the target workpiece 22 can be grasped, causing the hand 20 to grasp and convey the workpiece 22 to a predetermined position.

In step S210, the hand position and orientation deriving unit 15 determines whether the workpiece container 23 is empty. If the workpiece container 23 is not empty (NO in step S210), the processing proceeds to step S203. If the workpiece container 23 is empty (YES in step S210), the processing ends.

By using the above-described method, whether interference occurs during a grasp operation is determined in advance using the information processing apparatus 1, and the target workpiece 22 determined not to cause the interference is picked up (grasped).

In the first exemplary embodiment, the method has been described in which, when a detected workpiece is to be grasped, whether interference occurs between a peripheral object and a hand is previously determined by using the position and orientation of the target workpiece to identify the area of the workpiece on a two-dimensional image. More specifically, based on the position and orientation of the detected workpiece, the three-dimensional shape model of the workpiece is projected onto the observed image plane of a virtual camera having the same camera parameters as those of a measurement apparatus, and the three-dimensional points corresponding to the pixels on which the workpiece is projected are determined as the area of the workpiece to be grasped. Then, a three-dimensional spatial overlap is detected by using the three-dimensional shape data excluding the three-dimensional points determined as the area of the target workpiece, and the hand model so as to determine whether the interference occurs. Thereby, interference between a peripheral object and a hand can be correctly determined without an erroneous detection due to a measurement point in the area of the target workpiece even in a grasp operation of the hand extremely close to the target workpiece. The method is effective mainly when a workpiece detection method has the characteristic of detecting an individual workpiece in the surface layer of a pile of workpieces, which is not hidden by the other individual workpieces.

In the present exemplary embodiment, the method for determining whether interference with a hand occurs has been described, in which the three-dimensional points determined as the target workpiece are excluded from among the three-dimensional points obtained from the range image (in which the three-dimensional points other than the target workpiece are identified). However, as another method, whether interference with a hand occurs may be determined by using all the three-dimensional points on the range image, and if all the areas determined to cause the interference correspond to the target workpiece, a result indicating no occurrence of interference may be output and otherwise a result indicating occurrence of interference may be output.

In the present exemplary embodiment, only one piece of the teaching information is recorded to calculate the grasp position and orientation of the hand. However, a plurality of relative positions and orientations where the hand can grasp a target workpiece may be recorded in advance so as to calculate the position and orientation of the hand by selecting one from pieces of the teaching information according to the orientation of the workpiece. Alternatively, priorities may be assigned to a plurality of pieces of the teaching information to calculate the position and orientation of the hand by selecting a piece of the teaching information with a higher priority. If a plurality of pieces of the teaching information is recorded and if, in the interference determination processing, it is determined that the interference occurs, the position and orientation of the hand are calculated by selecting the grasp operation based on the teaching information with the next higher priority so that the interference determination is performed again.

In a second exemplary embodiment (hereinafter referred to as the present exemplary embodiment), a method will be described in which, when a detected workpiece is to be grasped, whether interference occurs between a peripheral object and a hand is previously determined by using the position and orientation of the target workpiece to identify the area of the workpiece on a three-dimensional image. In the present exemplary embodiment, based on a distance between the three-dimensional shape model of the target workpiece in the calculated position and orientation, and the three-dimensional points forming the three-dimensional data, a three-dimensional point having a small distance is determined as corresponding to the target workpiece to identify the three-dimensional point group corresponding to a peripheral object. This allows, even in a case where an individual workpiece hidden by other individual workpieces is detected, whether interference occurs between a peripheral object and a hand to be correctly determined without an erroneous detection due to a measurement point in the area of the target workpiece.

The configuration of an information processing apparatus and the processing of each of the processing units thereof in the present exemplary embodiment are basically similar to those of the information processing apparatus 1 illustrated in FIG. 2 according to the first exemplary embodiment, and therefore the description thereof is omitted here. Processing steps for picking up a workpiece from a pile of workpieces by previously determining whether interference occurs in a grasp operation is also basically similar to the flowchart illustrated in FIG. 2 according to the first exemplary embodiment, and therefore the description thereof is omitted here. However, the processing in steps S205, S206, and S207 in the present exemplary embodiment is different from that in the first exemplary embodiment. Thus, the description of the other steps S201, S202, S203, S204, S208, S209, and S210 is omitted and only steps S205, S206, and S207 will be described below.

In step S205, the target area identification unit 14 identifies, based on the position and orientation of the target workpiece 22 calculated in step S204, the three-dimensional points excluding the target workpiece 22 on the three-dimensional shape data. The processing in this step will be described with reference to FIGS. 5A to 5C.

Figure 5A:
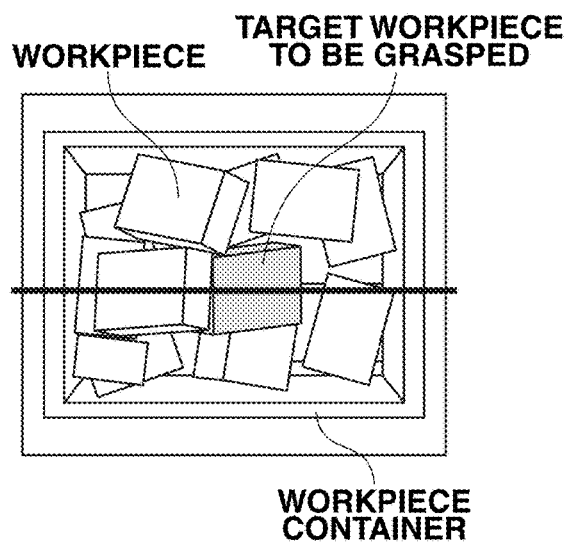
FIGS. 5A, 5B, and 5C illustrate schematic diagrams illustrating a determination as to whether objects around a target workpiece to be grasped interfere with a hand according to a second exemplary embodiment of the present invention.

FIG. 5A illustrates a range image in which a pile of workpieces in a container is captured, and the target workpiece 22 which is detected and whose position and orientation are calculated from the range image in step S204. On the range image obtained by the distance sensor 2, the three-dimensional points on the surface of the target workpiece 22 observed without being hidden by other individual workpieces are expected to be small enough in distance with the surface of the target workpiece 22 arranged based on the calculated position and orientation. Thus, the three-dimensional shape data excluding the target workpiece 22 is to be identified by the following method using the three-dimensional shape model of the workpiece stored in the work model storage unit 13 and the position and orientation of the target workpiece 22.

Figure 5B:
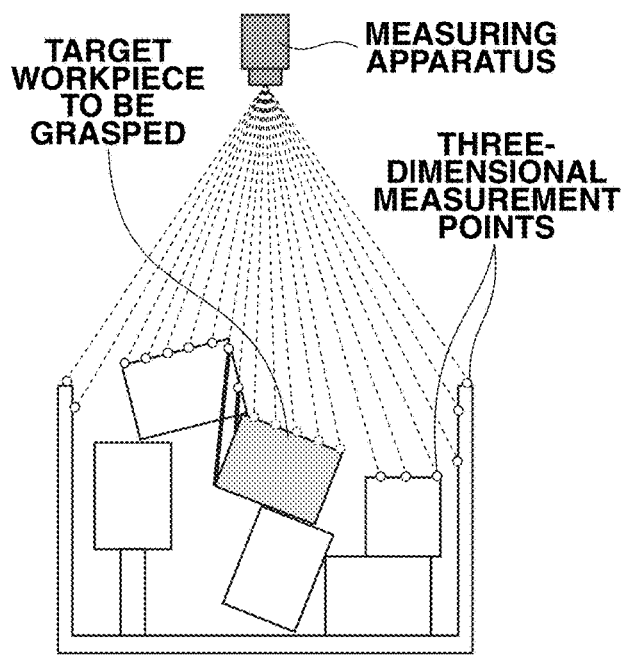

First, a distance $d_i$ between each of the three-dimensional points $k_{c\_1}$ (i=1 to N), and the three-dimensional model of the workpiece in the calculated position and orientation is calculated. Specifically, a line-of-sight vector from the original point of the sensor coordinate system to the pixel on the range image corresponding to the three-dimensional point $k_{c\_1}$ is obtained and a point where the three-dimensional model of the workpiece in the calculated position and orientation intersects with the line-of-sight vector at the shortest distance is obtained. A distance between this intersection point and the three-dimensional point $k_{c\_1}$ is taken as $d_i$ and the distance $d_i$ is recorded in association with the three-dimensional point. If there is no intersection point, a value which is extremely large with respect to an assumed distance value is recorded as the distance value. For example, if $d_i<10$ can be assumed, $d_i=1000000$ is recorded if there is no intersection point. FIG. 5B illustrates a cross section of the image illustrated in FIG. 5A. In FIG. 5B, straight lines indicated by broken lines show line-of-sight vectors. The straight lines indicated by thick lines show a distance between the obtained intersection point and the three-dimensional point $k_{c\_1}$. Next, it is to be determined whether the three-dimensional point $k_{c\_1}$ corresponds to the target workpiece 22 with reference to the recorded distance $d_i$. Specifically, a threshold θ for determining a small distance value is determined. If $d_i<=θ$, the three-dimensional point $k_{c\_1}$ is determined as corresponding to the target workpiece 22. If $θ≤d_i$, the three-dimensional point $k_{c\_1}$ is determined as corresponding to any object other than the target workpiece 22. By using this processing, blank circles indicated by broken lines illustrated in FIG. 5B are determined as the three-dimensional points corresponding to the target workpiece 22 because the value of the distance $d_i$ to the three-dimensional model of the workpiece is small.

In step S206, the position and orientation of the hand for grasping the workpiece 22 are calculated based on the position and orientation of the workpiece 22 derived in step S205. More specifically, a relative position and orientation between the workpiece 22 and the hand 20 in the grasp operation are recorded in advance as information for teaching the grasp operation. A coordinate transformation matrix representing the derived position and orientation of the workpiece 22 is multiplied by a coordinate transformation matrix representing the relative position and orientation between the workpiece 22 and the hand 20 based on the recorded teaching information so as to obtain the coordinate transformation matrix of the hand 20 in the sensor coordinate system and calculate the position and orientation between the workpiece 22 and the hand 20.

Figure 5C:
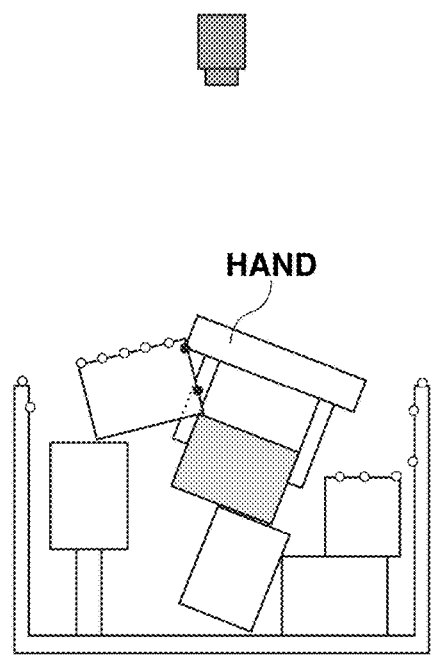

FIG. 5C illustrates a state where the hand 20 for grasping the target workpiece 22 illustrated in FIG. 5B is arranged by calculating the position and orientation of the hand 20 in this step. The three-dimensional points determined as corresponding to the target workpiece 22 in step S205 are removed.

In step S207, whether interference occurs between the three-dimensional shape data excluding the target workpiece 22 identified in step S205, and the hand 20 in the position and orientation derived in step S206 is determined. The method similar to the one according to the first exemplary embodiment may be used to perform the interference determination. In FIG. 5C, the three-dimensional points determined as interfering with the hand 20 among the three-dimensional points excluding the target workpiece 22 are indicated by black points.

In the second exemplary embodiment, the method has been described in which, when a detected workpiece is to be grasped, whether interference occurs between a hand and a peripheral object is previously determined by using the position and orientation of the workpiece to be grasped to identify the area of the workpiece on a three-dimensional image. More specifically, based on a distance between the three-dimensional shape model of the target workpiece in the calculated position and orientation and each of the three-dimensional points forming the three-dimensional data, a three-dimensional point having a small distance is determined as corresponding to the target workpiece so that the three-dimensional point group corresponding to a peripheral object is identified. This allows, even when an individual workpiece hidden by other individual workpieces is detected, whether interference occurs between a peripheral object and a hand to be correctly performed without an erroneous detection due to a measurement point in the area of the target workpiece. The method is mainly effective when a workpiece detection method has the characteristic of detecting an individual workpiece partially hidden by other individual workpieces.

In the present exemplary embodiment, the intersection of a line-of-sight vector heading towards the pixel on the range image corresponding to each of the three-dimensional points, and the three-dimensional shape model is obtained to calculate a distance to the three-dimensional point. However, another method may be used for the method for calculating a distance between the three-dimensional shape model of the workpiece and each of the three-dimensional points. For example, the shortest distance to the surface of the three-dimensional shape model of the workpiece in the calculate position and orientation is obtained and the value may be used instead.

A third exemplary embodiment will be described below.

The units of the information processing apparatus 1 illustrated in FIG. 2 may be configured by hardware. Further, the work model storage unit 13 may be configured by a memory, and the other units may be configured by computer programs.

In this case, a general personal computer (PC) can be applied to the information processing apparatus 1. For example, the work model storage unit 13 is included in a hard disc and a computer program for causing a CPU to execute the functions of the units excluding the work model storage unit 13 is stored in the hard disc. The CPU of the PC loads a computer program or data stored in the hard disc into the RAM and executes processing using the loaded computer program or data. Thus, the PC functions as the information processing apparatus 1. The above exemplary embodiments and modification examples may be used in combination as required.

Embodiments of the present invention can also be realized by a computer of a system or apparatus that reads out and executes computer executable instructions recorded on a storage medium (e.g., non-transitory computer-readable storage medium) to perform the functions of one or more of the above-described embodiment(s) of the present invention, and by a method performed by the computer of the system or apparatus by, for example, reading out and executing the computer executable instructions from the storage medium to perform the functions of one or more of the above-described embodiment(s). The computer may comprise one or more of a central processing unit (CPU), micro processing unit (MPU), or other circuitry, and may include a network of separate computers or separate computer processors. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

What is claimed is:

1. An information processing apparatus comprising:
one or more processors functioning as the following:
an obtaining unit configured to obtain, by using a sensor, a distance to each of a plurality of three-dimensional measurement points in space including a plurality of objects;
an acquiring unit configured to acquire a position and an orientation of a target object to be grasped among the plurality of objects based on the obtaining result obtained by the obtaining unit and a three-dimensional model of the object; and
an interference determination unit configured to determine whether interference occurs between the three-dimensional measurement points of which a distance to the three-dimensional model arranged on the position and the orientation of the target object to be grasped being acquired by the acquiring unit is equal to or more than a predetermined value, and model information representing a grasping unit.

2. The information processing apparatus according to claim 1, wherein the one or more processors functioning as one or more of the following further includes a control unit configured to control the grasping unit configured to grasp the target object when the interference determination unit determines that the interference does not occur between an object around the target object and model information representing the grasping unit.

3. The information processing apparatus according to claim 1, wherein the obtaining unit obtains the distance to each of the plurality of the three-dimensional measurement points based on an image in which a pattern projected in the space including the plurality of objects is captured.

4. The information processing apparatus according to claim 1, wherein the three-dimensional model information is a computer aided design (CAD) model.

5. The information processing apparatus according to claim 4,
wherein the interference determination unit arranges, in a virtual space, a model representing the grasping unit configured to grasp the target object at a position and an orientation where the grasping unit grasps the target object so as to determine within the virtual space whether interference occurs between an object around the target object and the grasping unit and model information representing the grasping unit.

6. An information processing method, comprising:
obtaining, by using a sensor, a distance to each of a plurality of three-dimensional measurement points in a space including a plurality of objects, and three-dimensional model information of the object;
acquiring a position and an orientation of a target object to be grasped among the plurality of objects based on the distance to each of the plurality of the three-dimensional measurement points and a three-dimensional model of the object obtained in the obtaining; and
determining whether interference occurs between the three-dimensional measurement points of which a distance to the three-dimensional model arranged on the position and the orientation of the target object to be grasped being acquired is equal to or more than a predetermined value, and model information representing a grasping unit.

7. A non-transitory computer readable storage medium storing a program for causing a computer to perform an information processing method comprising:
obtaining, by using a sensor, a distance to each of a plurality of three-dimensional measurement points in a space including a plurality of objects, and three-dimensional model of the object;
acquiring a position and an orientation of a target object to be grasped among the plurality of objects based on the distance to each of the plurality of the three-dimensional measurement points and the three-dimensional model information of the object obtained in the obtaining; and
determining whether interference occurs between the three-dimensional measurement points of which a distance to the three-dimensional model arranged on the position and the orientation of the target object to be grasped being acquired is equal to or more than a predetermined value, and model information representing a grasping unit.

8. The information processing method according to claim 6, wherein the obtaining the distance to each of the plurality of the three-dimensional measurement points based on an image in which a pattern projected in the space including the plurality of objects is captured.

9. The information processing apparatus according to claim 6, wherein the three-dimensional model information is a computer aided design (CAD) model.

10. The information processing method according to claim 7, wherein the obtaining the distance to each of the plurality of the three-dimensional measurement points based on an image in which a pattern projected in the space including the plurality of objects is captured.

11. The information processing apparatus according to claim 7, wherein the three-dimensional model information is a computer aided design (CAD) model.

12. An information processing apparatus comprising:
an obtaining unit configured to obtain a distance to each of a plurality of three- dimensional measurement points in space including a plurality of objects;
an acquiring unit configured to acquire a position and an orientation of a target object to be grasped among the plurality of objects based on the obtaining result obtained by the obtaining unit and a three-dimensional model of the object; and
an interference determination unit configured to determine whether interference occurs between a grasping unit when grasping the target objects to be grasped and the rest of the plurality of three-dimensional measurement points remained by removing, from the plurality of three-dimensional measurement points, a three-dimensional measurement point of which a distance from the three-dimensional model of the position and an orientation of the target object to be grasped are smaller than a predetermined value.

13. The information processing apparatus according to claim 12,
wherein the three-dimensional model information is a computer aided design (CAD) model.

14. The information processing apparatus according to claim 12,
wherein the acquiring unit specifies an area of the target object to be grasped based on the position and an orientation of the target object to be grasped.

15. The information processing apparatus according to claim 12,
wherein the interference determination unit determines whether the interference occurs by removing a three-dimensional measurement point of the area where the three-dimensional model information is projected, from the plurality of three-dimensional measurement points obtained by capturing the plurality of objects, based on an area of the target object to be grasped in a case where the target object to be grasped is captured by an imaging device.

16. The information processing apparatus according to claim 12, further comprising:
a control unit configured to control the grasping unit to grasp the target object to be grasped, in a case where the interference determination unit determines the interference does not occur.

17. The information processing apparatus according to claim 12, wherein the obtaining unit obtains the distance to each of the plurality of the three-dimensional measurement points based on an image in which a pattern projected in the space including the plurality of objects is captured.

18. An information processing apparatus comprising:
an obtaining unit configured to obtain a distance to each of a plurality of three- dimensional measurement points in space including a plurality of objects;
an acquiring unit configured to acquire a position and an orientation of a target object to be grasped among the plurality of objects based on the obtaining result obtained by the obtaining unit and a three-dimensional model of the object; and
an interference determination unit configured to determine whether interference occurs between a grasping unit to grasp the target objects to be grasped and the rest of the plurality of three-dimensional measurement points remained by removing, from the plurality of three-dimensional measurement points, a three-dimensional measurement point of which a distance from the surface of the three-dimensional model of the position and the orientation of the target object to be grasped among the three-dimensional measurement points are smaller than a predetermined value.

19. An information processing method comprising:
obtaining a distance to each of a plurality of three-dimensional measurement points in space including a plurality of objects;
acquiring a position and an orientation of a target object to be grasped among the plurality of objects based on the acquisition result obtained by the obtaining step and a three-dimensional model of the object; and
determining whether interference occurs between a grasping unit in a case where grasping the target objects to be grasped and the rest of the plurality of three-dimensional measurement points remained by removing, from the plurality of three-dimensional measurement points, a three-dimensional measurement point of which a distance from the three-dimensional model of the position and the orientation of the target object to be grasped are smaller than a predetermined value.

20. An information processing method comprising:
obtaining a distance to each of a plurality of three-dimensional measurement points in space including a plurality of objects;
acquiring a position and an orientation of a target object to be grasped among the plurality of objects based on the acquisition result obtained by the obtaining step and a three-dimensional model of the object; and
determining whether interference occurs between a grasping unit to grasp the target objects to be grasped and the rest of the plurality of three-dimensional measurement points remained by removing, from the plurality of three-dimensional measurement points, a three-dimensional measurement point of which a distance from the surface of the three-dimensional model of the position and the orientation of the target object to be grasped are smaller than a predetermined value.

21. A non-transitory computer readable storage medium storing a program for causing a computer to perform an information processing method comprising:
obtaining a distance to each of a plurality of three-dimensional measurement points in space including a plurality of objects;
acquiring a position and an orientation of a target object to be grasped among the plurality of objects based on the acquisition result obtained by the obtaining step and a three-dimensional model of the object; and
determining whether interference occurs between a grasping unit in a case where grasping the target object to be grasped and the rest of the plurality of three-dimensional measurement points remained by removing, from the plurality of three-dimensional measurement points, a three-dimensional measurement point of which a distance from the three-dimensional model of the position and the orientation of the target object to be grasped are smaller than a predetermined value.

22. A non-transitory computer readable storage medium storing a program for causing a computer to perform an information processing method comprising:
obtaining a distance to each of a plurality of three-dimensional measurement points in space including a plurality of objects;
acquiring a position and an orientation of a target object to be grasped among the plurality of objects based on the acquisition result obtained by the obtaining step and a three-dimensional model of the object; and determining whether interference occurs between a grasping unit to grasp the target object to be grasped and the rest of the plurality of three-dimensional measurement points remained by removing, from the plurality of three-dimensional measurement points, a three-dimensional measurement point of which a distance from the surface of the three-dimensional model of the position and the orientation of the target object to be grasped are smaller than a predetermined value.

\* \* \* \* \*